No. 747,519. PATENTED DEC. 22, 1903.
D. N. WEATHERS.
MEAT TENDERER.
APPLICATION FILED NOV. 19, 1902.
NO MODEL.
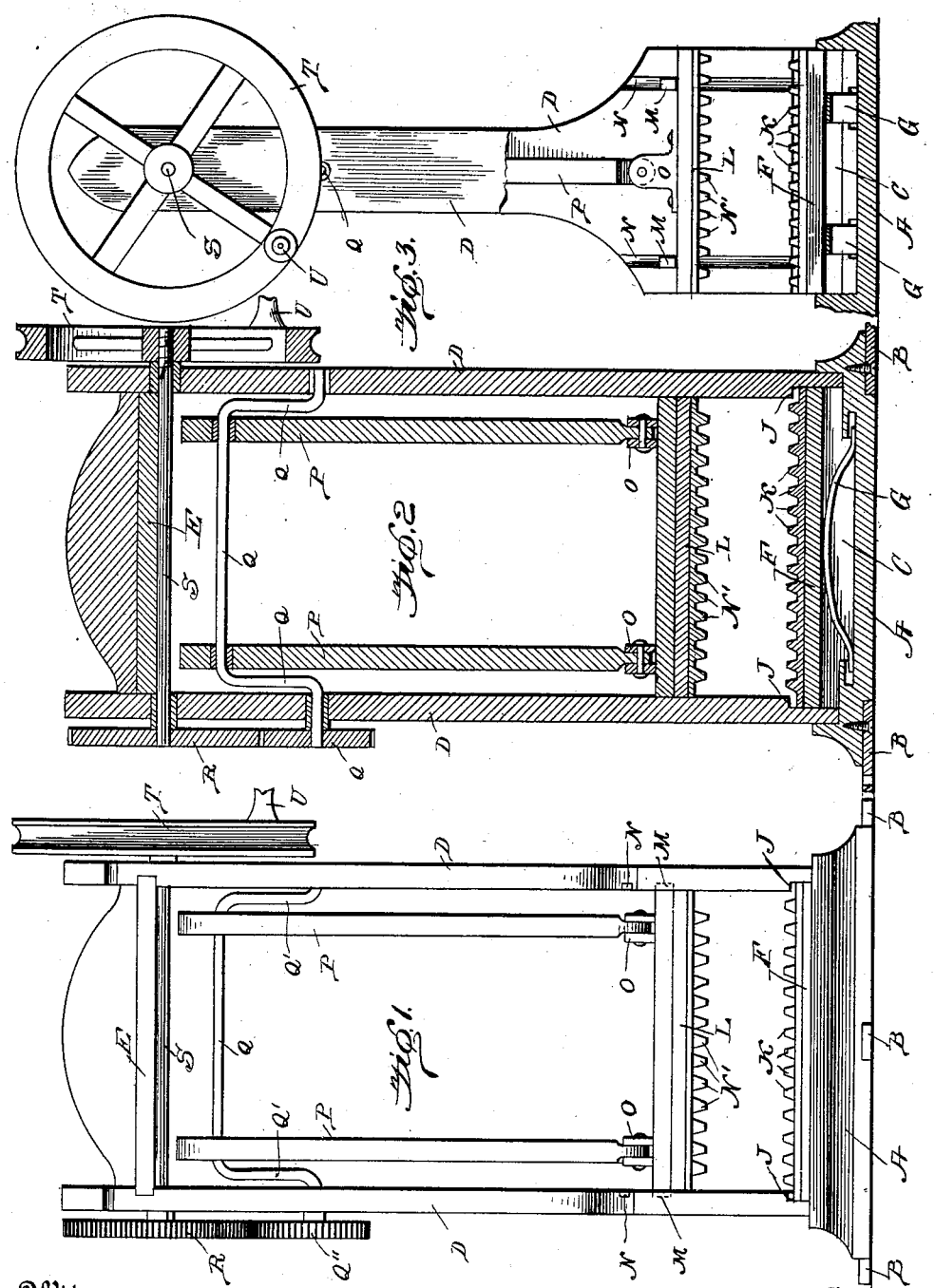
Witnesses
Bernard M. Offutt.
W. G. Crowley.
Inventor
David N. Weathers
by David T. Moore.
Attorney No. 747,519.

Patented December 22, 1903.

UNITED STATES PATENT OFFICE.

DAVID N. WEATHERS, OF MARENGO, INDIANA.

MEAT-TENDERER.

SPECIFICATION forming part of Letters Patent No. 747,519, dated December 22, 1903.

Application filed November 19, 1902. Serial No. 131,992. (No model.)

*To all whom it may concern:*

Be it known that I, DAVID N. WEATHERS, a citizen of the United States, residing at Marengo, in the county of Crawford and State of Indiana, have invented certain new and useful Improvements in Meat-Tenderers, of which the following is a specification.

This invention relates to improvements in meat-tenderers; and the main object of my invention is a provision of a simple mechanism for pounding the meat and separating the tough fibers therein, so as to make an otherwise tough steak tender.

Another object of my invention is a provision of a tenderer embodying novel features of construction and arrangement of parts, substantially as disclosed herein.

In the accompanying drawings, Figure 1 is a front elevation of the machine with the plates separated. Fig. 2 is a vertical central sectional view through the machine, and Fig. 3 is an end view with the lower portion of one of the standards removed.

Referring to the drawings, A designates a base, which is provided with the lugs B in order that the machine may be rigidly secured to any suitable support, such as a table or bench. This base is provided with a rectangular recess or box C, in the ends of which are mounted and project upwardly therefrom the two side supports or standards D, which are secured at the top by means of the crosspiece E. Mounted in the box or casing formed in the base is a plate F, under which may be mounted the springs G, which tend to push upward the plate and cause its ends to abut against the shoulders J, formed in the standards, these shoulders acting as a guard or guide to prevent the upward displacement of this plate. Upon the upper face of the plate I provide a series of rows of projections or teeth K, which are adapted to abut against the under side of the reciprocating plate L, which is provided with the outwardly-extending bars M, fitting in the vertical parallel recesses or slots N, formed in the inner faces of the standards. Upon the lower face of this plate are provided similar teeth N', which are adapted to intermesh with the teeth of the spring-actuated plate and compress the meat therebetween and so mangle the same as to tender it. Mounted upon the upper face of the reciprocating plate are the two grooved bosses O, in which are pivoted the lower ends of the parallel levers or arms P, in which is revolubly mounted the shaft Q, which is provided with the crank-shaped ends Q', which are revolubly mounted in the standard. Carried upon the other end of one of these crank-arms is a small pinion Q'', adapted to mesh with a large pinion R, carried upon one end of the horizontal shaft S, which is journaled in the upper portion of the standards and carried upon this other end and flywheel T, which is provided with a crank U in order that the shaft S may be revolved to convey to the upper plate L a reciprocating motion.

From the foregoing description, taken in connection with the drawings, it is evident that I provide a meat-tenderer whose operation and advantages are fully understood and appreciated, and it is readily seen that as the upper plate is reciprocated the meat being placed upon the lower spring-actuated plate is properly mangled, but as the spring-plate yields slightly the teeth in the plate are prevented from passing through the meat, and also the clogging of the plates and breaking of the machine is thereby prevented in case a small bone or hard substance should be placed between the plates.

What I claim as new is—

1. In a meat-tenderer, the combination of a hollow base having an outwardly-projecting surrounding flange provided with recesses in its lower end, detachable lugs B in said recesses, standards having their lower ends supported within the hollow portion of the base and extending upward above the case, said standards each being provided with a shoulder J near its lower end and upon its inner face, and a pair of vertical parallel recesses upon the inner face thereof, a pair of U-shaped springs having their ends freely mounted within the hollow of the base and their bowed portions extending upward, a lower mangling-plate mounted in the hollow of the base and resting upon the upper side of said springs and being limited in its upward movement by the shoulders J, a movable mangling-plate provided with outwardly-extending lugs which are slidably mounted in the vertical recesses of the standards, and means mounted in the upper portion of the standards connected to the movable plate to reciprocate the same in said recesses.

2. In a meat-tenderer, the combination of a base provided with a surrounding upwardly-extending rim, and a central recessed portion bounded upon two sides by recessed walls, substantially U-shaped springs having their free ends loosely mounted in the recesses of said walls and their bowed portions projecting upward, a pair of standards secured to opposite walls of the base and provided with shoulders J upon opposed faces thereof, a lower mangling-plate resting within the hollow of the base upon the springs and limited in its upward movement by the shoulders of the standards, a vertical reciprocating mangling-plate mounted in the standards, and mechanism for operating said vertical reciprocating mangling-plate supported by the upper part of the frame.

In testimony whereof I affix my signature in presence of two witnesses.

DAVID N. WEATHERS.

Witnesses:
JAMES H. WEATHERS,
KATE WEATHERS.